United States Patent
Otoguro et al.

(10) Patent No.: US 9,720,207 B2
(45) Date of Patent: Aug. 1, 2017

(54) LIGHT SCANNING APPARATUS

(71) Applicant: CANON KABUSHIKI KAISHA, Tokyo (JP)

(72) Inventors: Yasuaki Otoguro, Abiko (JP); Takehiro Ishidate, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 14/741,335

(22) Filed: Jun. 16, 2015

(65) Prior Publication Data

US 2015/0277082 A1    Oct. 1, 2015

Related U.S. Application Data

(62) Division of application No. 14/325,029, filed on Jul. 7, 2014, now Pat. No. 9,086,645.

(30) Foreign Application Priority Data

Jul. 24, 2013  (JP) ................................. 2013-153623

(51) Int. Cl.
G02B 7/18 (2006.01)
G03G 15/043 (2006.01)
G02B 26/12 (2006.01)

(52) U.S. Cl.
CPC ........... *G02B 7/181* (2013.01); *G02B 26/121* (2013.01); *G02B 26/125* (2013.01); *G03G 15/0435* (2013.01); *G03G 2215/0132* (2013.01)

(58) Field of Classification Search
CPC ........... B41J 2/451; B41J 2/471; G02B 26/12; G02B 26/101; G02B 26/10
See application file for complete search history.

(56) References Cited

U.S. PATENT DOCUMENTS 6,239,828 B1 * 5/2001 Ito .............................. B41J 2/451
                                                              347/241
6,411,325 B1    6/2002 Matsushita et al. .......... 347/134
(Continued)

FOREIGN PATENT DOCUMENTS

CN     102749707     10/2012
CN     102854621      1/2013
(Continued)

OTHER PUBLICATIONS

U.S. Appl. No. 14/310,945, filed Jun. 20, 2014.
(Continued)

*Primary Examiner* — Kristal Feggins
(74) *Attorney, Agent, or Firm* — Fitzpatrick, Cella, Harper & Scinto

(57) ABSTRACT

A light scanning apparatus, including: a light source; a deflector having a rotary polygon mirror configured to deflect the light beam emitted from the light source, and a motor configured to rotate the polygon mirror; a plurality of reflecting mirrors configured to reflect the light beam to the photosensitive member; and an optical box on which the light source is mounted, wherein the optical box has an installation wall on which the deflector is installed and a support wall positioned on a side of the photosensitive member with respect to the polygon mirror, the support wall being provided with a support portion configured to support at least one reflecting mirror, a stepped portion having a plurality of steps is formed between the installation wall and the support wall, and a back surface of the stepped portion has a shape following an inside surface of the stepped portion.

6 Claims, 6 Drawing Sheets

(56) References Cited

U.S. PATENT DOCUMENTS

| | | | |
|---|---|---|---|
| 7,149,021 B2 | 12/2006 | Yoshizawa | 359/216 |
| 7,522,326 B1 | 4/2009 | Otoguro | 359/216 |
| 7,684,099 B2 | 3/2010 | Otoguro | 359/216.1 |
| 8,432,426 B2 | 4/2013 | Sakamotor et al. | 347/134 |
| 8,773,482 B2 | 7/2014 | Tomioka | 347/134 |
| 8,830,289 B2 | 9/2014 | Iwai | 347/261 |
| 2002/0048072 A1 | 4/2002 | Ishihara | 347/134 |
| 2004/0085605 A1 | 5/2004 | Yoshizawa | 359/216 |
| 2006/0164504 A1 | 7/2006 | Kobayashi et al. | 347/233 |
| 2013/0002789 A1 | 1/2013 | Katayama | 347/224 |
| 2014/0267531 A1 | 9/2014 | Ishidate et al. | 347/137 |
| 2015/0002594 A1 | 1/2015 | Ishidate et al. | 347/118 |
| 2015/0092001 A1* | 4/2015 | Yoshida | B41J 2/451 347/118 |
| 2015/0183232 A1* | 7/2015 | Chen | B41J 2/451 347/137 |

FOREIGN PATENT DOCUMENTS

| | | |
|---|---|---|
| JP | 2003-248186 | 9/2003 |
| JP | 4170736 | 10/2008 |

OTHER PUBLICATIONS

Chinese Official Action dated Feb. 19, 2016, in counterpart Chinese Patent Application No. 201410353882.X, and English translation thereof.

* cited by examiner

LIGHT SCANNING APPARATUS

This application is a divisional of U.S. patent application Ser. No. 14/325,029, filed Jul. 7, 2014 (currently pending), which is incorporated by reference herein in its entirety, as if fully set forth herein, and claims the benefit of priority under 35 U.S.C. §119, based on Japanese Priority Application No. 2013-153623, filed Jul. 24, 2013, which is incorporated by reference herein in its entirety, as if fully set forth herein.

BACKGROUND OF THE INVENTION

Field of the Invention

The present invention relates to a light scanning apparatus used in an image forming apparatus such as a copying machine, a printer, a facsimile machine, and a multifunctional peripheral thereof.

Description of the Related Art

As a light scanning apparatus used in an electrophotographic image forming apparatus, a light scanning apparatus having the following configuration is well known. Specifically, there has been known a light scanning apparatus configured to deflect a light beam emitted from a light source by a rotary polygon mirror and to guide the deflected light beam onto a photosensitive surface of the photosensitive member by optical components such as a lens and a mirror, to form a latent image on a photosensitive member. An imaging optical system is formed of at least one fθ lens. The fθ lens has a special lens effective surface typified by an aspheric surface for the purpose of enhancing scanning characteristics. Further, a housing (hereinafter referred to as "optical box") configured to support and fix members of an optical system is formed of a resin molding because of the advantages such as the securement of a degree of freedom of a shape, the reduction in weight, and the reduction in price. In particular, the use of an optical box made of a resin is greatly advantageous in a tandem type image forming apparatus, because a large number of optical components are used, and further mounting directions and mounting methods of supporting and fixing the optical components are not uniform. On the other hand, the optical box made of a resin has a large coefficient of thermal expansion under the condition of an increased temperature, compared to an optical box made of a metal. Further, the optical box made of a resin has a low coefficient of thermal conductivity, compared to the optical box made of a metal. Therefore, when the optical box made of a resin is used, in the light scanning apparatus containing a heat source, a temperature distribution becomes non-uniform, and a hot portion and a cold portion occur partially. As a result, warpage and local distortion in different directions occur in the optical box.

A deflection member such as a rotary polygon mirror having a plurality of deflection reflecting surfaces has been often used in the light scanning apparatus. When the deflection member is driven, the temperature increases by the heat generation from a driving portion such as a motor. If light scanning is performed continuously for a long period of time, a rotation shaft receiving portion of the rotary polygon mirror and an IC chip mounted on a motor portion configured to drive the rotary polygon mirror are heated to a high temperature. Further, even in the case where light scanning is performed for a short period of time, the temperature logarithmically fluctuates and increases immediately after the start of the rotation of the motor. Therefore, the optical box is greatly distorted and deformed by a non-uniform increase in temperature in the light scanning apparatus. A lens, the rotary polygon mirror, and a mirror constituting the light scanning apparatus are housed in the optical box, and hence the positions of optical components such as the lens and the mirror are changed by the deformation of the optical box, with the result that the path through which a light beam passes and a reflecting direction are changed with time.

The deformation of the optical box occurs mainly for the following two causes. The first cause is a hot current of air, and the second cause is a radiation heat. The hot current of air which is the first cause occurs as follows. The rotary polygon mirror rotates at a high speed and hence generates wind, which absorbs heat generated on the periphery of a deflector to become hot current of air. The periphery of the deflector is surrounded by a rib provided perpendicularly to a bottom wall of the optical box so as to keep the strength of the optical box, and the way of the hot current is blocked by the rib so that the hot current of air stagnates around the deflector. Because of this, an increase in temperature on the periphery of the deflector becomes larger than that in the other portions of the optical box. Consequently, the optical box increases in temperature locally, which causes the deformation such as warpage and distortion in the optical box. Further, the radiation heat which is the second cause occurs as follows. The rotary polygon mirror rotates at a high speed, and hence the rotation shaft receiving portion of the rotary polygon mirror fitted in the optical box so as to position the deflector reaches a high temperature. Further, the IC chip mounted on the motor portion also generates heat. Then, portions immediately below the rotation shaft receiving portion and the location where the IC chip is mounted are heated locally by the radiation heat, with the result that the optical box expands and deforms.

As described above, by the deformation of the optical box, directions and amounts of light beams vary in different color stations so that light-condensing positions on surfaces to be scanned are changed, and thus a horizontal direction, a vertical direction, or a magnification of an image line is fluctuated, resulting in the degradation in image. In particular, in a tandem type image forming apparatus, a light beam position of each color is fluctuated, and hence color misregistration occurs when toner images of respective colors are superimposed. In order to solve the foregoing problem, there has been proposed a light scanning apparatus in which a rib, which has provided perpendicularly to the bottom portion of a housing main body, is inclined so that the hot current of air generated from a rotary polygon mirror and so on is diffused along the inclined rib (Japanese Patent No. 4170736).

However, according to the conventional method, certain effects are obtained with respect to the first cause of the deformation of the optical box described above, but there is a risk in that effects may not be obtained with respect to the second cause. That is, hot current of air generated from the deflector can be diffused to the periphery; however, hot current of air is blown to the inclined portion of the optical box, with the result that the entire optical box is greatly distorted by the distortion caused by the expansion and deformation of the inclined portion. The inclined portion of the optical box has a straight line shape, and hence the expansion thereof serves to distort the entire optical box. Further, the local deformation of the rotation shaft receiving portion of the rotary polygon mirror and also the deformation of expansion from the center of the rotation shaft receiving portion to the periphery thereof cannot be absorbed by the inclined portion formed into a straight line shape, which leads to the deformation of the entire optical box.

SUMMARY OF THE INVENTION

The present invention has been achieved under the above-mentioned circumstances, and it is an object of the present invention to reduce the deformation of an optical box with a simple configuration.

In order to solve the above-mentioned problems, according to an embodiment of the present invention, there is provided a light scanning apparatus, comprising: a light source configured to emit a light beam; a deflector including a rotary polygon mirror configured to deflect the light beam so that the light beam scans a photosensitive member, a motor configured to rotate the rotary polygon mirror, a driving unit configured to drive the motor, and a circuit board on which the motor and the driving unit are mounted; a plurality of reflecting mirrors configured to reflect the light beam deflected by the deflector to guide the light beam deflected by the deflector onto the photosensitive member; and an optical box on which the light source is mounted, the optical box being configured to contain the deflector and the plurality of reflecting mirrors, wherein the optical box includes an installation wall on which the deflector is installed and a support wall positioned on a side of the photosensitive member with respect to the rotary polygon mirror, the support wall being provided with a support portion configured to support at least one of the plurality of reflecting mirrors, a stepped portion including a plurality of steps is formed between the installation wall and the support wall, and a back surface of the stepped portion has a shape following a shape of the stepped portion inside the optical box.

According to another embodiment of the present invention, there is provided a light scanning apparatus, comprising: a light source configured to emit a light beam; a deflector including a rotary polygon mirror configured to deflect the light beam so that the light beam scans a photosensitive member, a motor configured to rotate the rotary polygon mirror, a driving unit configured to drive the motor, and a circuit board on which the motor and the driving unit are mounted; a plurality of reflecting mirrors configured to reflect the light beam deflected by the deflector to guide the light beam deflected by the deflector onto the photosensitive member; and an optical box on which the light source is mounted, the optical box being configured to contain the deflector and the plurality of reflecting mirrors, wherein the optical box includes an installation wall on which the deflector is installed and a support wall positioned on a side of the photosensitive member with respect to the rotary polygon mirror, the support wall being provided with a support portion configured to support at least one of the plurality of reflecting mirrors, a stepped portion including a plurality of steps is formed between the installation wall and the support wall, and a thickness of the stepped portion is smaller than a thickness of the installation wall.

According to further another embodiment of the present invention, there is provided a light scanning apparatus, comprising: a light source configured to emit a light beam; a deflector including a rotary polygon mirror configured to deflect the light beam so that the light beam scans a photosensitive member, a motor configured to rotate the rotary polygon mirror, a driving unit configured to drive the motor, and a circuit board on which the motor and the driving unit are mounted; an optical member configured to guide the light beam deflected by the rotary polygon mirror onto the photosensitive member; and an optical box on which the light source is mounted, the optical box being configured to contain the deflector and the optical member, wherein the optical box includes an installation wall on which the deflector is installed, a support wall positioned on a side of the photosensitive member with respect to the rotary polygon mirror, the support wall being provided with a support portion configured to support the optical member, and a stepped portion including at least two steps in a vicinity of the deflector.

According to further another embodiment of the present invention, there is provided a light scanning apparatus, comprising: a light source configured to emit a light beam; a deflector including a rotary polygon mirror configured to deflect the light beam so that the light beam scans a photosensitive member, a motor configured to rotate the rotary polygon mirror, a driving unit configured to drive the motor, and a circuit board on which the motor and the driving unit are mounted; a plurality of reflecting mirrors configured to reflect the light beam deflected by the deflector to guide the light beam deflected by the deflector onto the photosensitive member; and an optical box configured to contain the deflector and the plurality of reflecting mirrors, wherein the optical box includes an installation wall on which the deflector is installed and a support wall positioned on a side of the photosensitive member with respect to the rotary polygon mirror, the support wall being provided with a support portion configured to support at least one of the plurality of reflecting mirrors, and a waveform portion having a waveform in cross-section in a direction directed from the installation wall toward the support wall is formed between the installation wall and the support wall.

Further features of the present invention will become apparent from the following description of exemplary embodiments with reference to the attached drawings.

DESCRIPTION OF THE EMBODIMENTS

Now, exemplary embodiments of the present invention will be described in detail with reference to the drawings.

First Embodiment

[Configuration of Image Forming Apparatus]

Figure 1A:
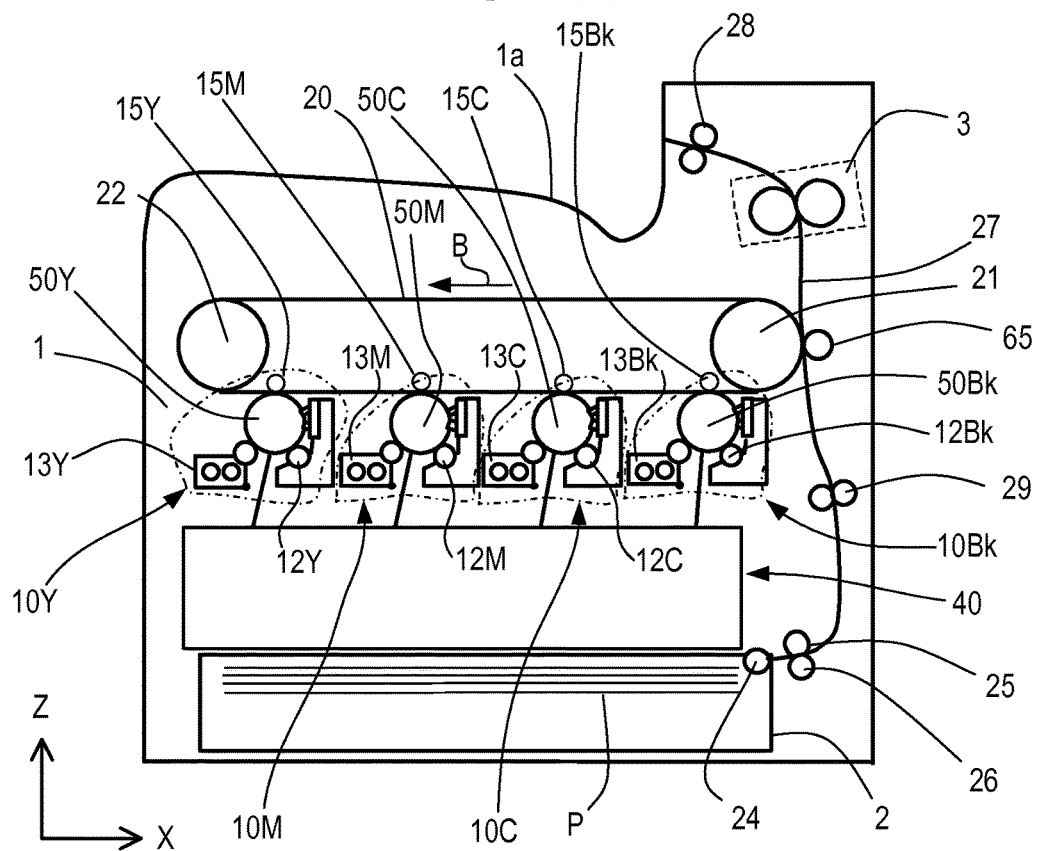
FIG. 1A is a sectional view of an image forming apparatus according to a first embodiment.

The configuration of an image forming apparatus according to a first embodiment will be described. FIG. 1A is a schematic structural view illustrating an entire configuration of a tandem type color laser beam printer of the embodiment. The laser beam printer (hereinafter referred to simply as "printer") includes four image forming engines (image forming portions) 10Y, 10M, 10C, and 10Bk (indicated by dashed-dotted lines) configured to form toner images of respective colors: yellow (Y), magenta (M), cyan (C), and black (Bk). Further, the printer includes an intermediate transfer belt 20 onto which a toner image is transferred from each of the image forming engines 10Y, 10M, 10C, 10Bk. Then, the printer is configured in such a manner that the toner images multi-transferred onto the intermediate transfer belt 20 are transferred onto a recording sheet P serving as a recording medium to form a full-color image.

The intermediate transfer belt 20 is formed into an endless shape and is passed over a pair of belt conveyance rollers 21, 22 so that a toner image formed by each image forming engine 10 is transferred onto the intermediate transfer belt 20 while the intermediate transfer belt 20 is rotated in a direction indicated by an arrow B. A secondary transfer roller 65 is provided at a position opposed to one belt conveyance roller 21 across the intermediate transfer belt 20. The recording sheet P is inserted between the secondary transfer roller 65 and the intermediate transfer belt 20 which are in pressure contact with each other, with the result that a toner image is transferred from the intermediate transfer belt 20 to the recording sheet P. The four image forming engines 10Y, 10M, 10C, 10Bk described above are arranged side by side under the intermediate transfer belt 20 so that a toner image formed in accordance with image information of each color is transferred onto the intermediate transfer belt 20 (hereinafter referred to as "primary transfer"). The four image forming engines 10 are arranged in the following order: the image forming engine 10Y for yellow, the image forming engine 10M for magenta, the image forming engine 10C for cyan, and the image forming engine for black 10B in a rotation direction (indicated by the arrow B) of the intermediate transfer belt 20.

Figure 1B:
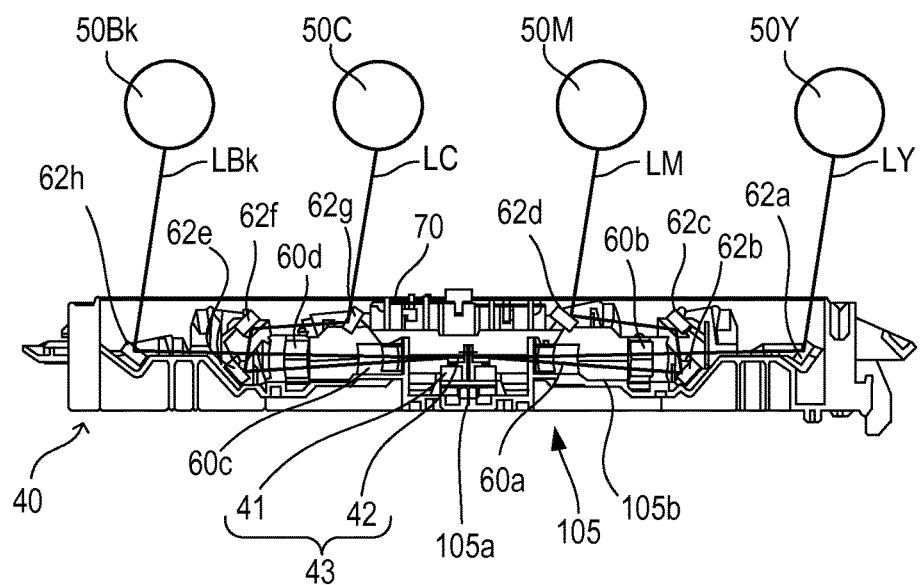
FIG. 1B is a sectional view of a light scanning apparatus according to the first embodiment.

Further, a light scanning apparatus 40 configured to expose a photosensitive drum 50 serving as a photosensitive member provided in each image forming engine to light in accordance with image information is provided below the image forming engine 10. Note that, the detailed illustration and description of the light scanning apparatus 40 are omitted in FIG. 1B and described later with reference to FIG. 2. As illustrated in FIG. 1B, the light scanning apparatus 40 is shared by all the image forming engines 10Y, 10M, 10C, 10Bk and includes four semiconductor lasers (not shown) each configured to emit a light beam modulated in accordance with image information of a corresponding color. Further, the light scanning apparatus 40 includes a deflector 43 which includes a rotary polygon mirror 42 which rotates at a high speed to deflect the light beams of 4 optical paths so that the light beams scan the photosensitive drums 50 in a rotation axis direction (Y-axis direction) and a motor unit configured to rotate the rotary polygon mirror 42. The deflector 43 includes the rotary polygon mirror 42, a motor configured to rotate the rotary polygon mirror 42, a motor unit 41 serving as a driving unit configured to drive the motor, and a circuit board 64 on which the motor and the motor unit 41 are mounted (see FIG. 3A). Each light beam scanned by the deflector 43 travels through a predetermined path while being guided by optical members provided in the light scanning apparatus 40. Then, each light beam which has travelled through the predetermined path passes through each irradiation port (not shown) provided in an upper portion of the light scanning apparatus 40 to expose each photosensitive drum 50 of each image forming engine 10 to light.

Each image forming engine 10 includes the photosensitive drum 50 and a charging roller 12 configured to charge the photosensitive drum 50 to a uniform background potential. Further, each image forming engine 10 includes a developing device 13 configured to develop an electrostatic latent image, formed on the photosensitive drum 50 (photosensitive member) by exposure to the light beam, to form a toner image. The developing device 13 forms a toner image in accordance with image information of each color on the photosensitive drum 50 serving as a photosensitive member.

A primary transfer roller (primary transfer member) 15 is provided at a position opposed to the photosensitive drum 50 of each image forming engine 10 across the intermediate transfer belt 20. When a predetermined transfer voltage is applied to the primary transfer roller 15, a toner image on the photosensitive drum 50 is transferred onto the intermediate transfer belt 20.

On the other hand, the recording sheet P is supplied from a feed cassette 2 loaded in a lower portion of a printer housing 1 to an inner portion of the printer, specifically to a secondary transfer position at which the intermediate transfer belt 20 and the secondary transfer roller (secondary transfer member) 65 are in abutment with each other. In an upper portion of the feed cassette 2, a pickup roller 24 configured to pick up the recording sheet P contained in the feed cassette 2 and a feed roller 25 are arranged side by side. A retard roller 26 configured to prevent a double feed of the recording sheet P is provided at a position opposed to the feed roller 25. A conveyance path 27 of the recording sheet P inside the printer is provided substantially vertically along a right side surface of the printer housing 1. The recording sheet P fed out from the feed cassette 2 positioned in a bottom portion of the printer housing 1 ascends through the conveyance path 27 and is sent to registration rollers 29 configured to control a timing of the recording sheet P entering the secondary transfer position. After a toner image is transferred onto the recording sheet P at the secondary transfer position, the recording sheet P is sent to a fixing device 3 (indicated by a broken line) provided on a downstream side in the conveyance direction. Then, the recording sheet P on which the toner image has been fixed by the fixing device 3 is delivered by delivery rollers 28 to a delivery tray 1a provided in an upper portion of the printer housing 1.

When a full-color image is formed by the color laser beam printer configured as described above, first, the light scanning apparatus 40 exposes the photosensitive drum 50 of each image forming engine 10 to light at a predetermined timing in accordance with image information of each color. Consequently, a toner image in accordance with the image information is formed on the photosensitive drum 50 of each image forming engine 10. In order to obtain a good quality image, it is necessary to reproduce the position of a latent image formed by the light scanning apparatus 40 with high accuracy.

[Configuration of Light Scanning Apparatus]

Figure 2:
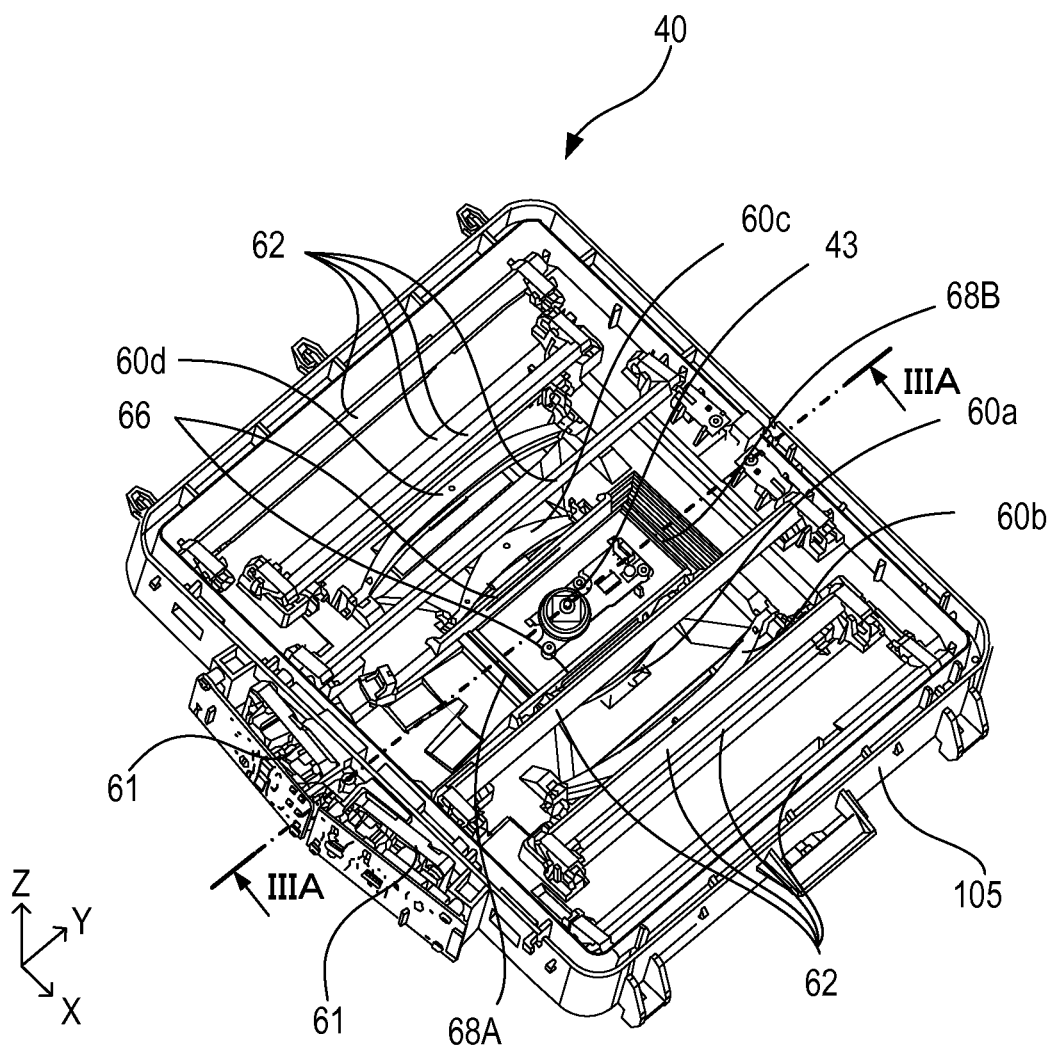
FIG. 2 is a view illustrating a configuration of the light scanning apparatus according to the first embodiment.

FIG. 1B is a schematic view illustrating an overview when the optical components are mounted, and FIG. 2 is a view illustrating the configuration of the light scanning apparatus 40 of the embodiment. Note that, the light scanning apparatus 40 includes an optical box 105 and a cover 70 configured to cover an opening of an upper portion of the optical box 105. A light source unit 61 on which a light source configured to emit a light beam is mounted and the deflector 43 including the rotary polygon mirror 42 configured to deflect a light beam and the motor unit 41 are provided on an outer peripheral portion of and inside the light scanning apparatus 40. Further, the light scanning apparatus 40 includes an optical lens 60 (60a to 60d) and a reflecting mirror 62 (62a to 62h) configured to guide light beams to the photosensitive drums 50 to provide images on the photosensitive drums 50. The optical box 105 includes an installation wall 105a on which the deflector 43 is installed and a support wall 105b positioned on a side of the photosensitive drum 50 (photosensitive member-side) with respect to the rotary polygon mirror 42, on which a support portion configured to support at least one of the reflecting mirrors 62a to 62h is formed.

A light beam LY corresponding to the photosensitive drum 50Y emitted from the light source unit 61 is deflected by the rotary polygon mirror 42 and enters the optical lens 60a. The light beam LY having passed through the optical lens 60a enters the optical lens 60b, and passes through the optical lens 60b to be reflected by the reflecting mirror 62a. The light beam LY reflected by the reflecting mirror 62a scans the photosensitive drum 50Y through a transparent window (not shown).

A light beam LM corresponding to the photosensitive drum 50M emitted from the light source unit 61 is deflected by the rotary polygon mirror 42 and enters the optical lens 60a. The light beam LM having passed through the optical lens 60a enters the optical lens 60b, and passes through the optical lens 60b to be reflected by the reflecting mirrors 62b, 62c, and 62d. The light beam LM reflected by the reflecting mirror 62d scans the photosensitive drum 50M through a transparent window (not shown).

A light beam LC corresponding to the photosensitive drum 50C emitted from the light source unit 61 is deflected by the rotary polygon mirror 42 and enters the optical lens 60c. The light beam LC having passed through the optical lens 60c enters the optical lens 60d, and passes through the optical lens 60d to be reflected by the reflecting mirrors 62e, 62f, and 62g. The light beam LC reflected by the reflecting mirror 62g scans the photosensitive drum 50C through a transparent window (not shown).

A light beam LBk corresponding to the photosensitive drum 50Bk emitted from the light source unit 61 is deflected by the rotary polygon mirror 42 and enters the optical lens 60c. The light beam LBk having passed through the optical lens 60c enters the optical lens 60d, and passes through the optical lens 60d to be reflected by the reflecting mirror 62h. The light beam LBk reflected by the reflecting mirror 62h scans the photosensitive drum 50Bk through a transparent window (not shown).

FIG. 2 illustrates the light scanning apparatus 40 with the cover 70 removed so that the inside of the optical box 105 can be seen, and illustrates a configuration of the embodiment for reducing the change in position of a light beam caused by an increase in temperature. The light source unit 61 on which the light source configured to emit light beams is mounted and the deflector 43 configured to reflect and deflect the light beams are provided on an outer peripheral portion of and inside the light scanning apparatus 40. Further, the optical lens 60 (60a, 60b) and the reflecting mirror 62 required for guiding light beams to the photosensitive drums 50 to provide images on the photosensitive drums 50 are provided in the light scanning apparatus 40.

Note that, in the following description, the rotation axis direction of the rotary polygon mirror 42 of the deflector 43 is defined as a Z-axis direction, the main scanning direction which is a scanning direction of the light beam or the longitudinal direction of the optical lens 60 or the reflecting mirror 62 is defined as the Y-axis direction, and the direction orthogonal to the Y-axis and the Z-axis is defined as an X-axis direction.

The light beam deflected and scanned by the deflector 43 passes through the first optical lens 60a having a strong power in the main scanning direction (Y-axis direction), and is then guided to the second optical lens 60b having a strong power in a sub-scanning direction (X-axis direction). The light beam having passed through the first optical lens 60a and the second optical lens 60b is reflected at least once by the reflecting mirror 62 and guided to the photosensitive drum 50 serving as a surface to be scanned to form an image.

(Stepped Portion)

Figure 3A:
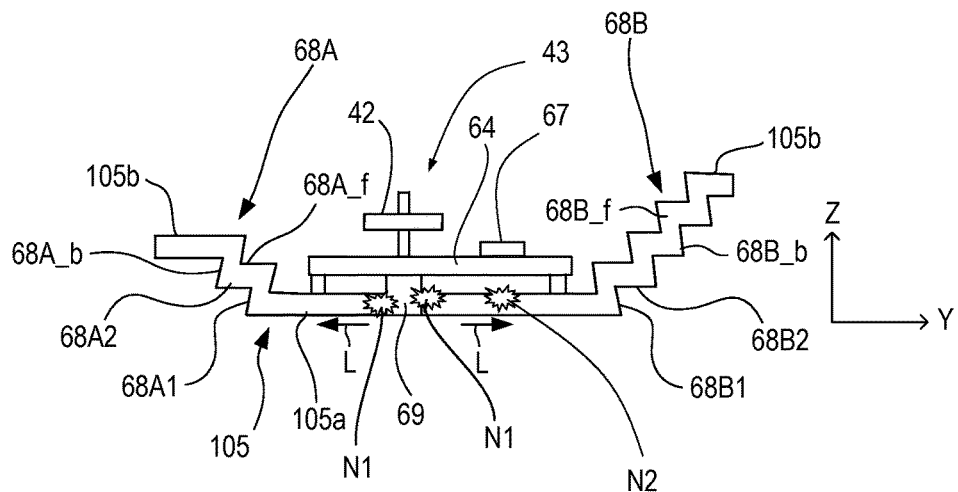
FIGS. 3A, 3B, and 3C are views illustrating a configuration of a stepped portion of the light scanning apparatus according to the first embodiment.
Figure 3B:
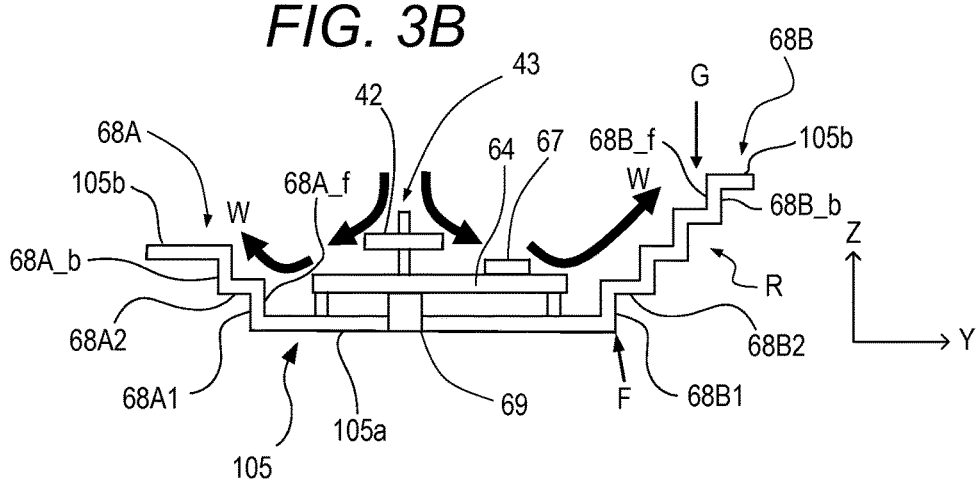

A stepped portion 68A and a stepped portion 68B are formed so as to be integrated with the optical box 105 of the embodiment. For example, as illustrated in FIGS. 3A and 3B, the stepped portion 68A and the stepped portion 68B are formed into a stepped shape of a plurality of steps including at least two steps in a manner that a plurality of surfaces are bent and connected (a waveform portion such as an accordion shape or a triangular waveform). In other words, the stepped portion 68A and the stepped portion 68B are formed of at least two steps so that the height increases as the stepped portion is distanced from the deflector 43. The thickness of the stepped portions 68A and 68B is smaller than that of the installation wall 105a on which the deflector 43 is installed. For example, the thickness of the stepped portions 68A and 68B is 2.5 mm, and the thickness of the installation wall 105a is 3 mm. The same applies to the case where the stepped portions 68A and 68B are waveform portions. Note that, FIGS. 3A and 3B are sectional views taken along the line IIIA-IIIA of FIG. 2, and the same applies to FIGS. 5 and 7.

Now, one of the plurality of steps forming the stepped portion 68A is focused. As illustrated in FIG. 3B, one step is formed of a first wall 68A1 substantially perpendicular to the installation wall (hereinafter referred to as "bottom wall") 105a, which is parallel to the XY-plane, of the optical box 105 and a second wall 68A2 which is substantially perpendicular to the first wall 68A1 and which is substantially parallel to the bottom wall 105a of the optical box 105. One step comprises the first wall 68A1 and the second wall 68A2, and at least two steps are continuously provided to form the stepped portion 68A of the embodiment. Similarly, one step comprises a first wall 68B1 and a second wall 68B2, and at least two steps are continuously provided to form the stepped portion 68B. In this case, the first wall 68B1 is substantially perpendicular to the bottom wall 105a, which is parallel to the XY-plane, of the optical box 105, and the second wall 68B2 is substantially perpendicular to the first wall 68B1 and substantially parallel to the bottom wall 105a of the optical box 105. Further, surfaces 68A_b and 68B_b (which also serve as back surfaces) on an outer side of the stepped portions 68A and 68B (see FIG. 3C) are shaped so as to follow surfaces 68A_f and 68B_f of the stepped portions 68A and 68B on an inner side of the optical box 105 so that the stepped portions 68A and 68B can be thermally deformed.

Note that, in the embodiment, the stepped portion 68A serving as a first stepped portion is provided between the deflector 43 and the light source unit 61 and is formed of two steps. On the other hand, the stepped portion 68B serving as a second stepped portion is provided on an opposite side of the stepped portion 68A with respect to the deflector 43 and is formed of four steps. Specifically, the stepped portion 68B is provided between the deflector 43 and an outer wall of the optical box 105 on an opposite side of the light source unit 61 with respect to the deflector 43. Note that, the reason that the number of steps of the stepped portion 68A is smaller than that of the stepped portion 68B will be described later.

[Regarding Radiation Heat]

As described above, a deflector bearing portion 69 of the deflector 43 generates heat when the rotary polygon mirror 42 of the deflector 43 rotates at a high speed. Further, an IC chip 67 mounted on the motor unit 41 configured to drive the rotary polygon mirror 42 of the deflector 43 also generates heat. Therefore, as illustrated in FIG. 3A, the optical box 105 is locally heated by radiation heat in a bearing portion vicinity N1 where the deflector bearing portion 69 is fitted into the optical box 105 and in a portion N2 immediately below the position where the IC chip 67 is mounted. When the deflector bearing portion 69 and the portion of the optical box 105 immediately below the position where the IC chip 67 is mounted are heated, a stress acts in directions indicated by the arrows L in FIG. 3A by the local expansion of the optical box 105, and the optical box 105 is deformed so as to push away surrounding members. Note that, such a stress is also referred to as an expansion deformation stress.

In the embodiment, by providing the stepped portions 68A and 68B on the optical box 105, the deformation of the optical box 105 caused by the stress acting in the directions indicated by the arrows L can be absorbed by the stepped portions 68A and 68B. Specifically, in the stepped portion 68A, the first wall 68A1 forming the step is not substantially perpendicular to the bottom wall 105a of the optical box 105 because of the stress acting in the directions indicated by the arrows L, and the second wall 68A2 is not substantially perpendicular to the first wall 68A1 because of the stress acting in the directions indicated by the arrows L (see FIG. 3A). On the other hand, similarly in the stepped portion 68B, the first wall 68B1 forming the step is not substantially perpendicular to the bottom wall 105a of the optical box 105 because of the stress acting in the directions indicated by the arrows L, and the second wall 68B2 is not substantially perpendicular to the first wall 68B1 because of the stress acting in the directions indicated by the arrows L. Thus, the stepped portions 68A and 68B of the embodiment are deformed by the stress acting in the directions indicated by the arrows L. Then, the stepped portions 68A and 68B are deformed by the stress acting in the directions indicated by the arrows L so that the entire optical box 105 is prevented from being deformed by the stress acting in the directions indicated by the arrows L. Therefore, it can be said that the stepped portions 68A and 68B absorb the deformation of the entire optical box 105 caused by the stress acting in the directions indicated by the arrows L.

In particular, when the attitude of the light source unit 61 provided on the side of the stepped portion 68A is changed by the deformation of the optical box 105, the optical characteristics of the light source unit 61 is changed. Therefore, the technical effects obtained by causing the stepped portion 68A to absorb the deformation of the optical box 105 are great. Accordingly, the deformation of the entire optical box 105 can be reduced by causing the stepped portion 68A to absorb the deformation of the optical box 105, with the result that the change in irradiation position of a light beam emitted from the light source unit 61 can be reduced.

Further, as described above, the stepped portion 68B is provided on an opposite side of the light source unit 61 with respect to the deflector 43. In the same way as the stepped portion 68A, the stepped portion 68B can also prevent an expansion deformation stress caused by heat of the deflector bearing portion 69 and the like from being transmitted to the surrounding more widely. Unlike the outer wall of the optical box 105 on the side where the light source unit 61 is provided, the outer wall of the optical box 105 on an opposite side with respect to the deflector 43 is not provided with holes and the like and hence has high stiffness. When this outer wall is increased in temperature and deformed, warpage and distortion of the entire optical box 105 are caused. However, by providing the stepped portion 68B in a place opposite to the stepped portion 68A with respect to the deflector 43, the entire distortion of the optical box 105 can be suppressed, and further the change in irradiation position of a light beam can be reduced.

After the operation of the light scanning apparatus of the image forming apparatus starts, the bearing portion vicinity N1 and the portion N2 immediately below the IC chip 67 of the optical box 105 become hottest, and the bearing portion vicinity N1 and the portion N2 immediately below the IC chip 67 start to expand largely. The deformation caused by the expansion of the bearing portion vicinity N1 and the portion N2 immediately below the IC chip 67 presses the surrounding optical box's material and spreads to the surrounding, and hence a stress acts in the directions indicated by the arrows L illustrated in FIG. 3A. When receiving the stress acting in the directions indicated by the arrows L, the stepped portions 68A and 68B are deformed to absorb the stress, thereby preventing other portions of the optical box 105, for example, a mirror seating surface which greatly influences a change in irradiation position of a light beam from being deformed.

[Regarding Hot Current of Air]

As illustrated in FIG. 3B, the stepped portions 68A and 68B of the embodiment are configured so that a side G farther away from the deflector 43 is positioned higher than a side F closer to the deflector 43. In this configuration, when the deflector 43 rotates at a high speed, an air flowed outwardly from the center of the deflector 43 can be smoothly guided from the periphery of the deflector 43 to an outer side as indicated by arrows W. The current of air generated by the high-speed rotation of the deflector 43 is hot current of air containing heat released from the deflector bearing portion 69 and the IC chip 67. Therefore, in the case where the deflector 43 is surrounded by a rib for reinforcement, the rib being provided perpendicularly to the bottom wall 105a of the optical box 105 as in the conventional art, hot current of air stagnates in the periphery of the deflector 43 to cause a state in which the hot air becomes stagnant without flowing. Therefore, in the conventional configuration, the local deformation of the optical box 105 is accelerated.

However, by providing the stepped portions 68A and 68B as in the embodiment, the hot current of air which has occurred can be diffused smoothly in a wide range along the slope formed by the stepped portions 68A and 68B. This can reduce a difference in temperature occurring in the light scanning apparatus 40. Note that, there is a gap between the highest step of the stepped portion 68B and the cover 70 of the optical box 105, and hence a flow of hot current of air indicated by the arrows W can be diffused from the gap to the other portions of the optical box 105. Accordingly, the thermal deformation of the optical box 105 caused when hot current of air stagnates in the vicinity of the deflector 43 can also be reduced, and color misregistration caused by a change in irradiation position of a light beam can be greatly reduced.

(Regarding Rib of Stepped Portion)

The slope of the stepped portion 68B of the embodiment extends from below to above so as to intersect with a plane (parallel to the XY-plane) that passes through a deflection point at which a light beam is deflected and that is perpendicular to a deflecting surface (parallel to the Z-axis). With this configuration, hot current of air which has flowed out by the high-speed rotation of the rotary polygon mirror 42 of the deflector 43 is reliably guided and smoothly sent to the surrounding. Further, the stiffness of the optical box 105 can be enhanced by forming a rib provided in a space R defined by the difference in height of the steps.

Figure 3C:
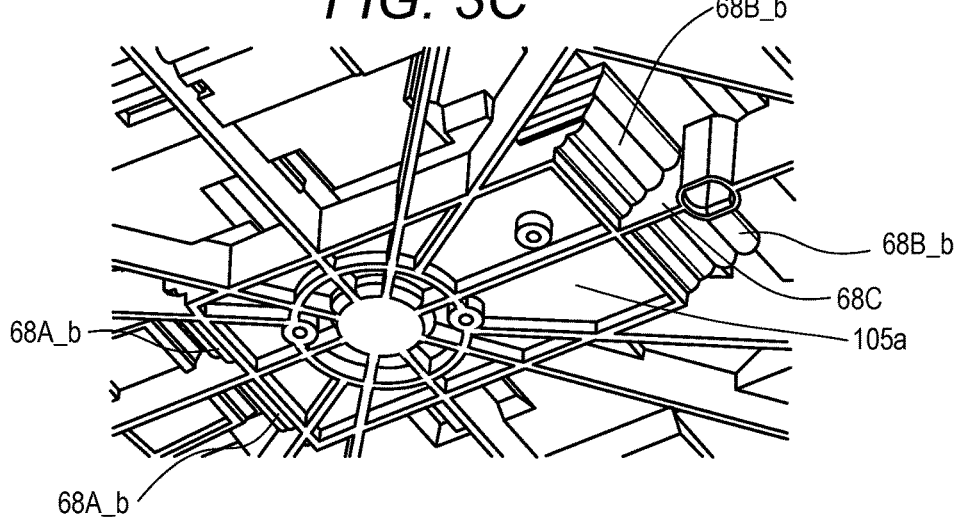

For example, a rib 68C of the stepped portion 68B of the embodiment is provided as illustrated in FIG. 3C. FIG. 3C is a view of the optical box 105 when viewed from the bottom wall 105a of the optical box 105, that is, when viewed from the back side of the optical box 105. Further, as illustrated in FIG. 3C, in the space R, the rib 68C extending along the line IIIA-IIIA of FIG. 2 is provided on the optical box 105. In order for the stepped portion 68 to absorb the stress acting in the directions indicated by the arrows L effectively, it is desired that the number of ribs provided in the space R be smaller. On the other hand, in order to enhance the stiffness of the optical box 105, it is desired that the number of ribs provided in the space R be larger. Thus, the number of ribs for reinforcement provided in the space R is determined based on the balance between the effect of the absorption of a stress by the stepped portion 68 and the effect of enhancing stiffness by the rib with respect to each optical box.

Further, as for the stepped portion 68 of the embodiment, the height from the bottom wall 105a of the optical box 105 becomes larger in the stepped portion 68B provided on the side opposite to the light source unit 61 with respect to the deflector 43, than in the stepped portion 68A provided between the deflector 43 and the light source unit 61. That is, the height of the stepped portion 68B provided on a side opposite to the stepped portion 68A is set to be higher than the height of the stepped portion 68A provided on an incident light side of a light beam on which the height of the stepped portion 68A is limited. Consequently, a space (also referred to as "sectional space") through which a light beam does not pass can be used effectively, and the stiffness of the optical box 105 can be further enhanced.

(Regarding Light-Shielding Wall)

In the embodiment, in order to prevent unintended light (hereinafter referred to as "flare light") reflected by each lens surface from entering other image forming engines to illuminate other photosensitive drums 50, a light-shielding wall 66 configured to prevent the flare light is provided between the deflector 43 and the first optical lens 60a. The light-shielding wall 66 is provided in parallel to a YZ-plane as illustrated in FIG. 2. A seating surface configured to determine the position in an optical axis direction of the first optical lens 60a is provided in a part of the light-shielding wall 66. In general, with this configuration, a large scanning field angle can be provided so that the light scanning apparatus 40 can be miniaturized.

Figure 4A:
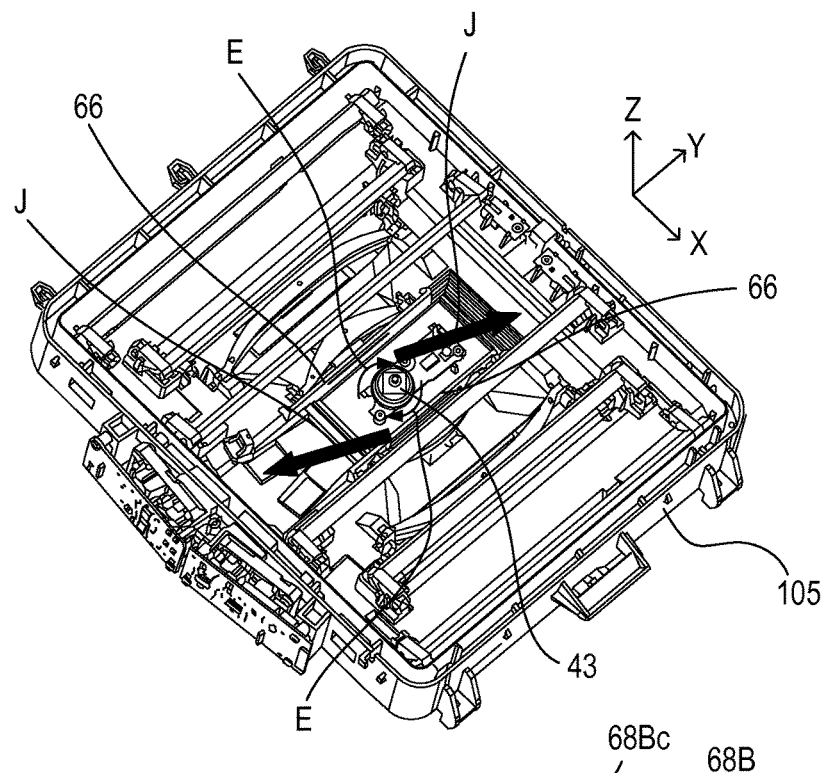
FIG. 4A is a view illustrating a flow of hot current of air in the first embodiment.

As illustrated in FIG. 4A, by the presence of the light-shielding wall 66 in the vicinity of the deflector 43, the current of air generated when the deflector 43 rotates in a clockwise direction (indicated by an arrow E in FIG. 4A) in the case where the optical box 105 is viewed from above is strongly flowed out in directions indicated by arrows J. That is, in an apparatus of type in which a light beam is deflected in a counter direction as in the light scanning apparatus of the embodiment, hot current of air flows in a great amount toward the stepped portion 68, and hence the efficiency for absorbing thermal deformation is improved. Note that, the light-shielding wall 66 has a wall shape rising in the Z-axis direction, and hence the deformation of the light-shielding wall 66 does not influence warpage and the like of the entire optical box 105, if any.

[Curved Portion or Bent Portion of Stepped Portion]

Figure 4B:
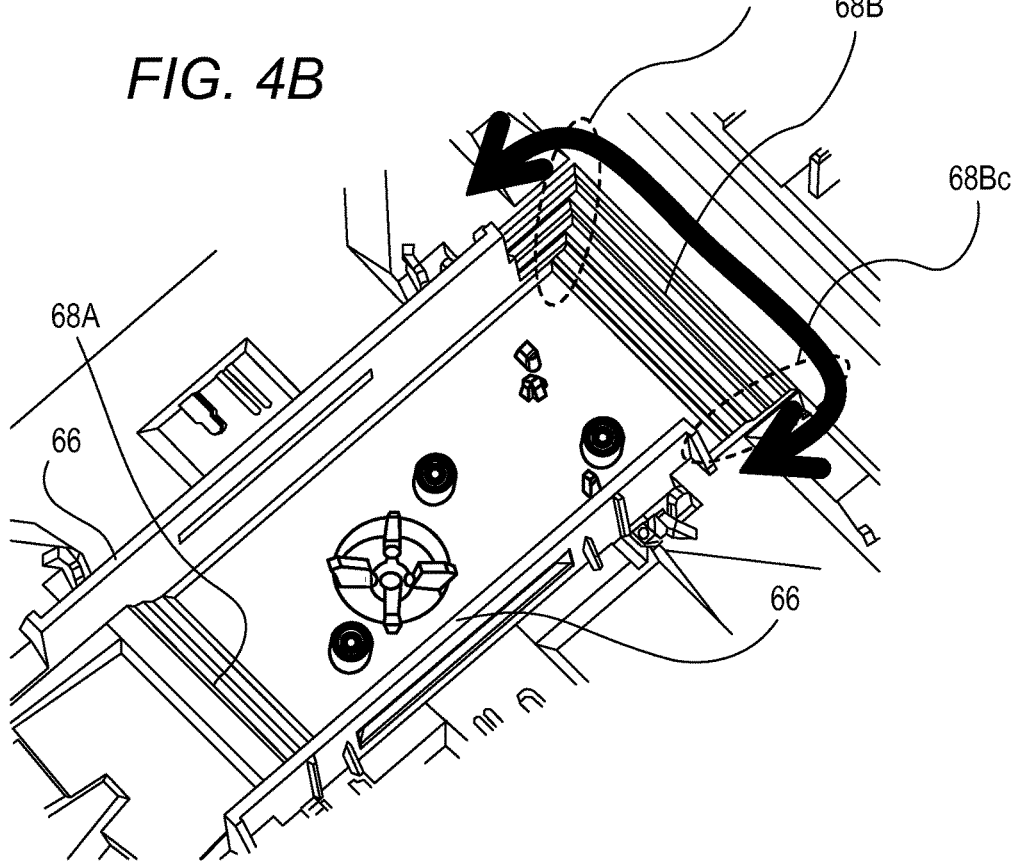
FIG. 4B is a view illustrating a bent portion of the stepped portion in the first embodiment.

Further, as illustrated in FIG. 4B, the stepped portion 68B is configured so as to have a curved portion or a bent portion 68Bc (portion surrounded by a broken line in FIG. 4B) when the optical box 105 is viewed from above in the rotation axis direction (Z-axis direction) of the deflector 43. That is, as indicated by a two-headed bold arrow in FIG. 4B, the stepped portion 68B has an arc shape or a substantially U-shape as viewed along the Z-axis direction. Note that, in FIG. 4B, the deflector 43 is omitted for ease of viewing of the shape of the stepped portion 68B. In this way, in the periphery of the deflector 43, the stepped portion 68B is provided in a portion in which there are no optical components such as an optical lens and hence a stepped shape can be provided, so as to surround the deflector 43. Consequently, the deformation of the mirror seating surface and the like can be further suppressed, and a change in irradiation position caused by increase in temperature can be reduced. Note that, the stepped portion 68A may also have a curved portion or a bent portion as viewed along the Z-axis direction.

Note that, the stress acting in the directions indicated by the arrows L illustrated in FIG. 3A acts radially around the deflector 43 on the bottom wall 105a of the optical box 105. In other words, the stress acting in the directions indicated by the arrows L acts in all the directions around the deflector 43 in the bottom wall 105a, parallel to the XY-plane, of the optical box 105. Therefore, ideally, it is desired that a stepped portion configured to absorb the stress acting in the directions indicated by the arrows L be provided in the entire periphery surrounding the deflector 43. However, actually, in order not to influence an optical path of a light beam from the light source unit 61 to the deflector 43 and an optical path of a light beam from the deflector 43 to the optical lens 60, there is a limit to the range in which the stepped portion can be provided in the periphery of the deflector 43. In the embodiment, as an example, the stepped portions 68A and 68B are configured as illustrated in FIG. 4B; however, it is appropriate to provide a stepped portion so that the stepped portion surrounds the periphery of the deflector 43 as much as possible within a range not influencing an optical path of a light beam.

[Case Having Only One Step]

Figure 5:
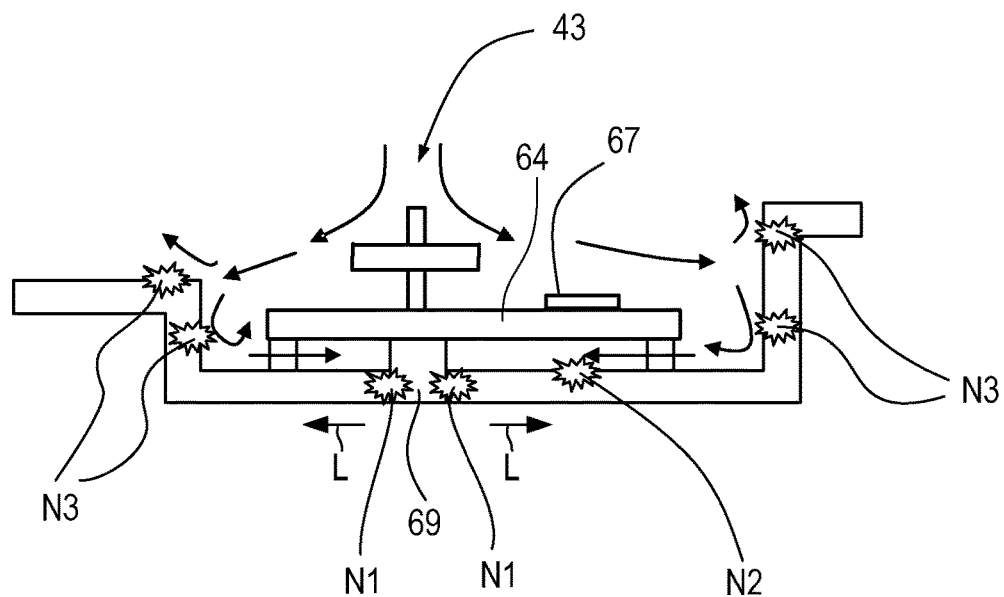
FIG. 5 is a view illustrating the case where a stepped portion has one step for comparison with the first embodiment.

Now, an optical box in which a stepped portion having one large step is provided as illustrated in FIG. 5 will be described. The stepped portion having only one step exhibits the effect of absorbing the deformation of the deflector bearing portion 69 and the portion immediately below the IC chip 67 to some extent so as not to influence the surrounding. However, as illustrated in FIG. 5, stagnant portions N3 of the hot current of air generated by the deflector 43 occur, and hence the hot current of air cannot smoothly flow throughout the light scanning apparatus. Therefore, in the stepped portion having only one step, there is a risk in that the temperature difference may increase in the periphery of the deflector 43 as well as the deflector bearing portion 69 and the portion immediately below the IC chip 67, compared to an outer circumferential portion of the optical box 105, and a change in irradiation position of a light beam may increase. Therefore, the stepped portions 68A and 68B are set to have at least two steps as in the embodiment.

Effect of the Embodiment

In order to confirm the effect of the embodiment, an amount of displacement of the optical box 105 having the stepped portion 68 of a plurality of steps of the embodiment and an amount of displacement of an optical box not having the stepped portion 68 of a plurality of steps were measured and compared to each other. Further, the IC chip 67 and the deflector bearing portion 69 were regarded as heat sources, and simulation analysis was conducted considering heat transfer, radiation, and a flow current of air.

Figure 6A:
FIGS. 6A, 6B, and 6C are views illustrating comparison results between the first embodiment and a conventional example.

FIG. 6A is a graph showing an amount of displacement [μm (micrometer)] of the mirror seating surface which significantly influences a change in irradiation position of a light beam in the optical box 105. In FIG. 6A, the left bar represents an amount of displacement of an optical box (indicated by "OBLIQUE SLOPE") having a conventional wall surface simply provided with a slope without the stepped portion 68, and the right bar represents an amount of displacement of the optical box 105 (indicated by "STEPPED SLOPE") having the stepped portion 68 of the embodiment. As shown in FIG. 6A, the amount of displacement of the conventional optical box is about 50 μm, whereas the amount of displacement of the optical box 105 of the embodiment is about 30 μm.

Figure 6B:
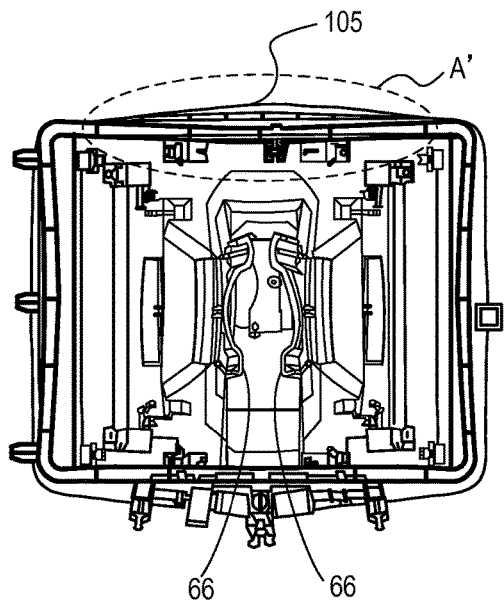
Figure 6C:
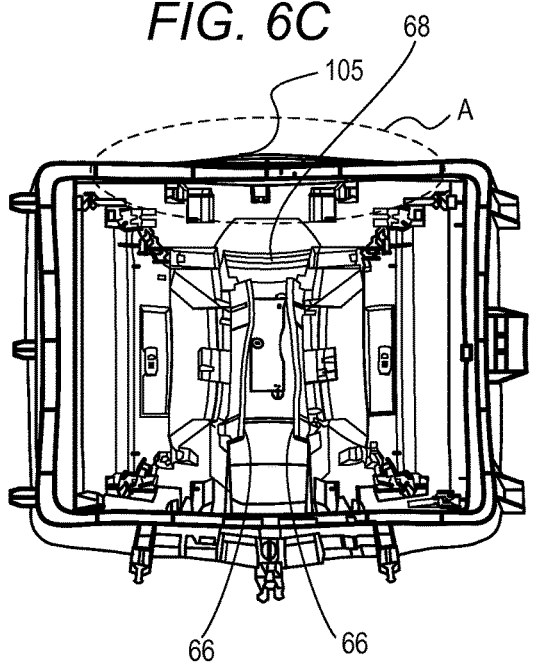

Further, FIG. 6B illustrates a thermal deformation analysis result of the conventional optical box not having a stepped portion, and FIG. 6C illustrates a thermal deformation analysis result of the optical box 105 having the stepped portion 68 of the embodiment. In the optical box having a conventional configuration illustrated in FIG. 6B, the deformation of a portion A' enclosed by a broken line is particularly conspicuous. In contrast, in the optical box 105 of the embodiment illustrated in FIG. 6C, it is understood that the deformation of a portion A enclosed by a broken line corresponding to the conventional portion A' is reduced compared to the conventional art. Further, in FIG. 6B of the conventional art, the deformation of the light-shielding wall 66 is larger than that of FIG. 6C of the embodiment, and hence it is understood that hot current of air which has occurred stagnates in the vicinity of the deflector 43.

Accordingly, when the conventional optical box not having a stepped portion is compared to the optical box 105 having the stepped portion 68 of the embodiment, it is understood that the amount of displacement is reduced by about 40% in the embodiment, compared to the conventional art. Further, similarly in the inspection of an actual product based on the simulation, the reduction effect was confirmed.

As described above, according to the embodiment, the deformation of the optical box can be reduced with a simple configuration.

Second Embodiment

[Configuration of Stepped Portion]

Figure 7:
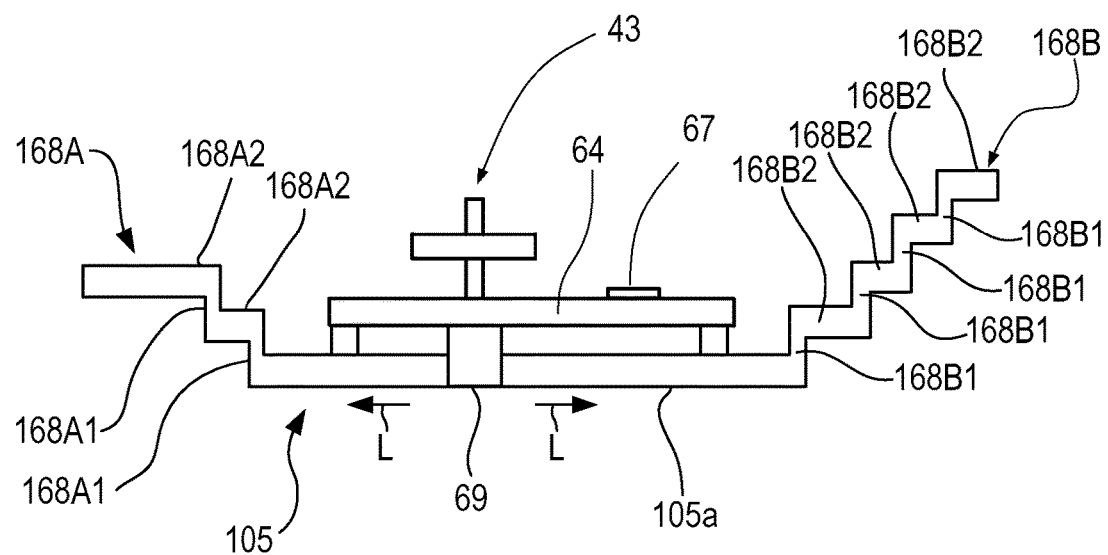
FIG. 7 is a view illustrating a configuration of a stepped portion of a light scanning apparatus according to a second embodiment.

FIG. 7 is a view illustrating the configuration of a stepped portion 168 of a second embodiment. A stepped portion 168A and a stepped portion 168B of the embodiment are configured so that the thickness of each wall forming the stepped portions 168A and 168B is non-uniform. In the embodiment, in the stepped portion 168B, a thickness of portions 168B1 perpendicular to the bottom wall 105*a* of the optical box 105 is thinner than a thickness of portions 168B2 parallel to the bottom wall 105*a* of the optical box 105. Note that, the portion 168B1 corresponds to the first wall 68B1 of the first embodiment, and the portion 168B2 corresponds to the second wall 68B2 of the first embodiment. Similarly, in the stepped portion 168A, a thickness of first walls 168A1 corresponding to the first wall 68A1 of the first embodiment is thinner than a thickness of second walls 168A2 corresponding to the second wall 68A2 of the first embodiment. With such a configuration, when a stress acting in directions indicated by arrows L is exerted on the stepped portions 168A and 168B, the stepped portions 168A and 168B are likely to be deformed. Consequently, a change in irradiation position of a light beam caused by the deformation of the optical box 105 due to a locally-increased temperature can be reduced.

Further, a portion having a thickness difference in the stepped portion 168 may be located at any position in the stepped portion 168A or the stepped portion 168B to exhibit the effects. For example, the thickness of the portion 168B1 and the thickness of the portion 168B2 may be reversed. Specifically, the thickness of the portion 168B1 perpendicular to the bottom wall 105*a* of the optical box 105 may be set to be thicker than the thickness of the portion 168B2 parallel to the bottom wall 105*a* of the optical box 105. Even in such a case, the deformation of the optical box 105 can be reduced. Note that, in the embodiment, a deformation stress generated in the bearing portion vicinity N1 of the deflector bearing portion 69 and the portion N2 immediately below the IC chip 67, which are significantly influenced by heat, is parallel to the directions indicated by the arrows L as illustrated in FIG. 3A, in other words, the bottom wall 105*a* of the optical box 105. Therefore, as described above, the thickness of the portion 168B1 perpendicular to the directions indicated by the arrows L in which the stress acts is thin, and the thickness of the portion 168B2 parallel to the directions indicated by the arrows L in which the stress acts is thick. With such a configuration, the effect of absorbing the deformation by the stepped portions 168A and 168B can be further produced.

As described above, according to the embodiment, the deformation of the optical box can be reduced with a simple configuration.

Other Embodiment

In the foregoing embodiments, the case where the stepped portion 68 (168) is formed so as to be integrated with the optical box 105 made of a resin has been described. However, the stepped portion 68 (168) can be formed as a member separate from the optical box 105 and attached to the optical box 105. In this case, a portion (hereinafter referred to as "attachment portion of the deflector 43") corresponding to the bottom wall 105*a* of the optical box 105 on which the deflector 43 is mounted is included in the separate member. As described above, by the heat generated from the deflector bearing portion 69 and the IC chip 67, a stress acts radially on the bottom wall 105*a* of the optical box 105 around the deflector 43 so that the optical box 105 is deformed. In order for the stepped portion 68 (168) to absorb the deformation caused in the attachment portion of the deflector 43, it is necessary that the attachment portion of the deflector 43 and the stepped portion 68 (168) be formed integrally. Therefore, in the case where the stepped portion 68 (168) is formed as a separate member, the attachment portion of the deflector 43 which is influenced by radiation heat is included in the separate member. That is, the attachment portion of the deflector 43 may be formed of a member different from the optical box 105, and the stepped portion 68 (168) may be formed integrally with the attachment portion.

As described above, also in the embodiment, the deformation of the optical box can be reduced with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-153623, filed Jul. 24, 2013, which is hereby incorporated by reference herein in its entirety.

What is claimed is:

1. A light scanning apparatus, comprising:
   a light source configured to emit a light beam;
   a deflector including a rotary polygon mirror configured to deflect the light beam so that the light beam scans a photosensitive member, a motor configured to rotate the rotary polygon mirror, a driving unit configured to drive the motor, and a circuit board on which the motor and the driving unit are mounted;
   a plurality of reflecting mirrors configured to reflect the light beam deflected by the deflector to guide the light beam deflected by the deflector onto the photosensitive member; and
   an optical box on which the light source is mounted, the optical box being configured to contain the deflector and the plurality of reflecting mirrors,
   wherein the optical box includes an installation portion on which the deflector is installed and a stepped portion including a plurality of steps disposed between the installation portion and a side wall of the optical box,
   wherein the plurality of steps include a farther step and a nearer step of which the farther step is farther from the installation portion than the nearer step, and
   wherein a height of the farther step is higher than a height of the nearer step.

2. A light scanning apparatus according to claim 1, wherein the stepped portion includes a curved portion or a bent portion.

3. A light scanning apparatus according to claim 1, wherein the optical box is made of a resin, and the stepped portion is formed integrally with the optical box.

4. A light scanning apparatus according to claim 1, wherein a back surface of the stepped portion has a shape following a shape of the stepped portion inside the optical box.

5. A light scanning apparatus according to claim 1, wherein the stepped portion is disposed on a side opposite to a side on which the light source is mounted with respect to the deflector.

6. A light scanning apparatus according to claim 1, wherein a support portion for an optical member is formed on an uppermost step of the plurality of steps included in the stepped portion.

* * * * *